United States Patent
Huck et al.

(10) Patent No.: US 6,408,380 B1
(45) Date of Patent: Jun. 18, 2002

(54) EXECUTION OF AN INSTRUCTION TO LOAD TWO INDEPENDENTLY SELECTED REGISTERS IN A SINGLE CYCLE

(75) Inventors: Jerome C. Huck, Palo Alto, CA (US); Glenn T. Colon-Bonet, Ft. Collins, CO (US); Alan H. Karp, Palo Alto, CA (US); David A. Fotland; Dean A. Mulla, both of San Jose, CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/316,446

(22) Filed: May 21, 1999

(51) Int. Cl.[7] .............................................. G06F 9/312
(52) U.S. Cl. ........................ 712/225; 711/149; 712/200
(58) Field of Search ................................ 712/220, 225, 712/200; 711/149

(56) References Cited

U.S. PATENT DOCUMENTS

| | | | | |
|---|---|---|---|---|
| 5,291,586 A | * | 3/1994 | Jen et al. ..................... | 712/220 |
| 5,390,307 A | * | 2/1995 | Yoshida ....................... | 712/225 |
| 5,481,734 A | * | 1/1996 | Yoshida ....................... | 712/225 |
| 5,613,121 A | * | 3/1997 | Blainey ........................ | 717/9 |
| 5,684,983 A | * | 11/1997 | Ando .......................... | 712/225 |
| 5,913,054 A | * | 6/1999 | Mallick et al. ............. | 712/220 |
| 6,072,508 A | * | 6/2000 | Devic .......................... | 345/553 |
| 6,104,731 A | * | 8/2000 | Chow .......................... | 370/537 |
| 6,253,312 B1 | * | 6/2001 | Elliott et al. ................. | 712/222 |

* cited by examiner

Primary Examiner—Kenneth S. Kim

(57) ABSTRACT

Method and apparatus for storing and executing an instruction to load two independent registers with two values is disclosed. In one embodiment, a computer-readable medium is encoded with an instruction including an opcode field specifying that the instruction is an instruction to load two independent registers with a first value and a second value, a source field specifying the first value and the second value, a first target register field specifying a first target register to load with the first value; a second target register field specifying a second target register to load with the second value. A system to execute the instruction is also disclosed.

30 Claims, 4 Drawing Sheets

EXECUTION OF AN INSTRUCTION TO LOAD TWO INDEPENDENTLY SELECTED REGISTERS IN A SINGLE CYCLE

FIELD OF THE INVENTION

The present invention is directed to a method and apparatus for loading values to registers in a computer processor and, more particularly, to a method and apparatus for loading values to independent registers.

DESCRIPTION OF THE RELATED ART

Conventional computers include a central processing unit (CPU) for executing computer program instructions, a main memory (such as a Random Access Memory (RAM)), and a register file. The main memory includes a plurality of memory locations, each of which is programmable to store a value (also referred to as a "word") having a fixed number of bits, such as 32 or 64. Memory locations in the main memory are typically used to store executable program instructions and associated data. The CPU executes program instructions stored in the main memory. Each model of CPU recognizes a distinct set of program instructions, referred to as a program instruction set, having predetermined functions and formats. For example, conventional program instruction sets typically include an ADD instruction for adding the values stored in two memory locations. Such an ADD instruction may, for example, consist of three fields: a first field specifying that the instruction is an ADD instruction, a second field specifying the address of the first memory location to add, and a third field specifying the address of the second memory location to add. The three fields of such an ADD instruction are typically stored in three consecutive memory locations in the main memory or within a single memory location.

The register file includes a plurality of registers, which are memory locations, typically located in the CPU, that the CPU can access very quickly compared to accessing the memory locations in the main memory. Program instructions involving registers typically include placing a value (such as a value stored in a memory location) into a specified register (referred to as a "load" operation), copying a value stored in a specified register to a specified memory location (referred to as a "store" operation), and performing arithmetic operations, such as addition and multiplication, on values stored in memory locations and registers.

The speed with which program instructions can be executed by the CPU thus depends, in part, on the speed with which values can be loaded to registers in the register file. Some CPUs attempt to increase load speed by providing a program instruction, referred to as a "load pair" instruction, that allows a pair of values to be loaded to a pair of consecutive registers in the register file. For example, a conventional load pair instruction may specify a source memory location and a target register. Execution of the load pair instruction causes the value in the source memory location to be loaded into the target register, and causes the value in the memory location immediately following the source memory location to be loaded into the register immediately following the target register. In other words, such a load pair instruction causes two consecutive memory locations to be loaded into two consecutive registers. The address of the source memory location is typically required to be an even number.

Conventional load pair instructions, therefore, are limited to loading consecutive registers. This limits the applicability of conventional load pair instructions to situations in which values are to be loaded into consecutive registers. In other situations where two values must be loaded to two registers, a pair of conventional load instructions must be used, thereby losing the advantage of the increased speed provided by use of a load pair instruction.

One environment in which the applicability of conventional load pair instructions is limited is in conjunction with processors which use a special kind of register file referred to as a "rotating register file." Registers in such a register file do not have fixed numerical identifiers. Rather, the physical registers in a rotating register file are dynamically assigned logical register numbers that may not correspond to the physical locations of the registers in the register file. Programs executing on the processor address registers using their logical register numbers, which the processor converts into physical register numbers that are used to address the register file. In a rotating register file approach, two logically contiguous values cannot be assigned to adjacent register locations. Conventional load pair instructions, as described above, are limited to loading pairs of consecutive registers. It is therefore not possible to use a conventional load pair instruction to load a pair of non-consecutive registers.

The ability to load pairs of non-consecutive registers is particularly useful in certain situations involving rotating register files, such as in compiler optimizations involving software pipelining. For example, rotating register files are sometimes used to speed up the execution of loops having instructions which require multiple cycles for execution. In conventional systems, each iteration of such a loop is delayed by the instruction requiring multiple cycles. Use of a rotating register file permits multiple iterations of the loop to be executed in parallel. When an instruction refers to a register (e.g., R5), that register is viewed as a logical register and the corresponding physical register is incremented for each iteration of the loop. Thus, several iterations of the loop may be in progress in different physical registers, and execution of the loop may be operating on physical registers that are not consecutive. It is not possible to load such physically non-consecutive registers using conventional load pair instructions.

SUMMARY

In one aspect, the invention is directed to a computer-readable medium encoded with an instruction for execution by a processor. The instruction comprises an opcode field specifying an instruction to load two independent registers with a first value and a second value; a source field specifying the first value and the second value; a first target register field specifying a first target register to load with the first value; and a second target register field specifying a second target register to load with the second value. In one embodiment the computer-readable medium comprises the memory accessible to the processor. In a further embodiment, the source field specifies an address of a first location in the memory, the first location containing the first value. In yet another embodiment, the address of the first location has a predetermined relationship with an address of a second location in the memory, and the processor is configured to derive the address of the second location from the address of the first location based on the predetermined relationship. In another embodiment the address of the first location and the address of the second location differ by one word. In a further embodiment the opcode field, the source field, the first target register field, and the second target register field comprise bit fields of a single word accessible to the processor. In yet another embodiment the opcode field, the source field, the first target register field, and the second target register field each comprises a word accessible to the processor.

In another aspect, the invention is directed to a method for executing an instruction to load two independent registers with a first value and a second value. The method comprises steps of: (A) receiving an instruction including an opcode field specifying an instruction to load two independent registers with the first value and the second value, a source field specifying the first value and the second value, a first target register field specifying a first target register to load with the first value, and a second target register field specifying a second target register to load with the second value; (B) providing a first target register signal, specifying the first target register, to a first register port address input of a register file; and (C) providing a second target register signal, specifying the second target register, to a second register port address input of the register file. In one embodiment the method further comprises steps of: (D) providing the first value to a first register port of the register file; and (E) providing the second value to a second register port of the register file. In another embodiment the method further comprises steps of: (F) storing the first value in the first target register; and (G) storing the second value in the second target register. In yet another embodiment the source field specifies an address of a first location in a memory accessible to a processor, the first location containing the first value. In one embodiment the address of the first location has a predetermined relationship with an address of a second location in the memory, and the method further comprises a step of: (D) deriving the address of the second location from the address of the first location based on the predetermined relationship. In another embodiment the step (D) comprises a step of adding one word to the address of the first location to derive the address of the second location. In a further embodiment the opcode field, the source field, the first target register field, and the second target register field comprise bit fields of a single word accessible to a processor. In yet a further embodiment the opcode field, the source field, the first target register field, and the second target register field each comprises a word accessible to the processor.

In a further aspect, the invention is directed to an apparatus for executing an instruction to load two independent registers with a first value and a second value. The apparatus comprises: means for receiving an instruction including an opcode field specifying that the instruction is an instruction to load two independent registers with the first value and the second value, a source field specifying the first value and the second value, a first target register field specifying a first target register to load with the first value, and a second target register field specifying a second target register to load with the second value; means for providing a first target register signal, specifying the first target register, to a first register port address input of a register file; and means for providing a second target register signal, specifying the second target register, to a second register port address input of the register file. In one embodiment the apparatus further comprises means for providing the first value to a first register port of the register file; and means for providing the second value to a second register port of the register file. In another embodiment the apparatus further comprises means for storing the first value in the first target register; and means for storing the second value in the second target register. In a further embodiment the source field specifies an address of a first location in a memory accessible to a processor, the first location containing the first value. In yet a further embodiment the address of the first location has a predetermined relationship with an address of a second location in the memory, and the apparatus further comprises: means for deriving the address of the second location from the address of the first location based on the predetermined relationship. In one embodiment the means for deriving comprises means for adding one word to the address of the first location to derive the address of the second location. In another embodiment the opcode field, the source field, the first target register field, and the second target register field comprise bit fields of a single word accessible to a processor. In a further embodiment the opcode field, the source field, the first target register field, and the second target register field each comprises a word accessible to the processor.

In yet a further aspect, the invention is directed to a system for executing an instruction to load two independent registers with a first value and a second value. The system comprises: a processor comprising an input to receive an instruction including an opcode field specifying that the instruction is an instruction to load two independent registers with the first value and the second value, a source field specifying the first value and the second value, a first target register field specifying a first target register to load with the first value, and a second target register field specifying a second target register to load with the second value; a first output to provide a first target register signal specifying the first target register; and a second output to provide a second target register signal specifying the second target register; a memory comprising a first output to provide a first memory data signal representing the first value and having a second output to provide a second memory data signal representing the second value; and a register file comprising a first register port to receive the first memory data signal, a second register port to receive the second memory data signal, a first register port address input to receive the first target register signal, and a second register port address input to receive the second target register signal, the register file being configured to store the first value in the first target register and to store the second value in the second target register. In one embodiment the source field specifies an address of a first location in the memory, the first location containing the first value. In another embodiment the address of the first location has a predetermined relationship with an address of a second location in the memory, and the processor is configured to derive the address of the second location from the address of the first location based on the predetermined relationship. In a further embodiment the address of the first location and the address of the second location differ by one word. In yet another embodiment the opcode field, the source field, the first target register field, and the second target register field comprise bit fields of a single word accessible to the processor. In another embodiment the opcode field, the source field, the first target register field, and the second target register field each comprises a word accessible to the processor.

DETAILED DESCRIPTION

In one aspect, the present invention is directed to an instruction, in an instruction set of a programmable computer processor, for loading a pair of values to a pair of independent registers. The instruction loads a pair of "independent" registers in that the instruction is capable of loading any two registers, without requiring any predetermined relationship between the two registers. For example, the two registers loaded by the instruction need not be consecutive registers. The pair of values may be generated in any way, such as by fetching the pair of values from a pair of memory locations or by specifying the pair of values in the instruction. The instruction may be tangibly embodied in a computer-readable medium, such as a computer-readable memory (e.g., a RAM or ROM), for execution by a computer processor. In another aspect, the present invention is directed to a computer system for executing an instruction for loading a pair of values to a pair of independent registers.

Figure 1:
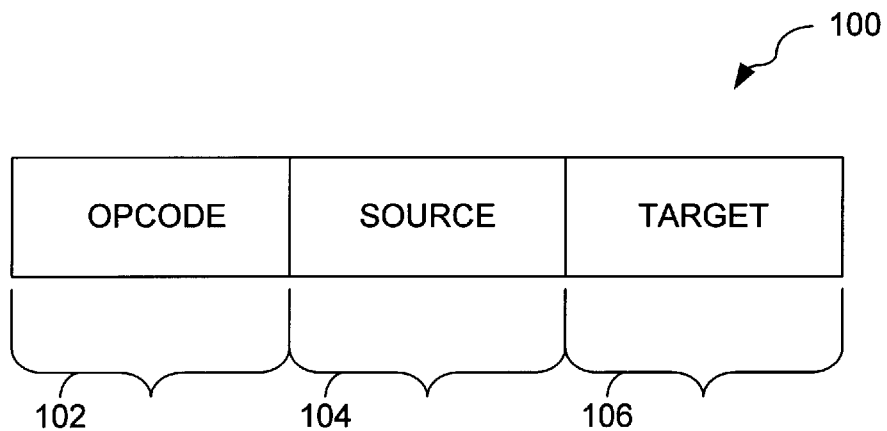
FIG. 1 is a block diagram of a prior art instruction for loading a pair of consecutive registers from a pair of consecutive memory locations.

Referring to FIG. 1, an example of a prior art instruction 100, executable by a computer processor, for loading a pair of consecutive registers from a pair of memory locations is shown. The instruction 100 includes an OPCODE field 102 specifying that the instruction 100 is an instruction to load two consecutive registers from a pair of memory locations, a SOURCE field 104 specifying an address of a first location in a memory accessible to the computer processor, and a TARGET field 106 specifying a first target register to load from the first memory location.

The instruction 100 is illustrated in FIG. 1 in block diagram form for ease of illustration. Typically, the particular format of the instruction 100 is specified by the associated computer processor. For example, each of the OPCODE field 102, SOURCE field 104, and TARGET field 106 includes a predetermined number of bits and is interpreted by the computer processor in a predetermined manner. For example, the computer processor typically recognizes a predetermined value stored in the OPCODE field 102 as the opcode corresponding to an instruction for loading two consecutive registers from a pair of memory locations. The computer processor recognizes other values stored in the OPCODE field 102 as opcodes for other instructions, such as conventional ADD instructions. The SOURCE field 104 typically specifies the address of the first memory location in a format that may be used to address the memory accessible to the computer processor. The TARGET field 106 typically specifies a numerical identifier that uniquely identifies the first target register to load from the first memory location.

The instruction 100 shown in FIG. 1 is typically tangibly embodied in a computer-readable medium, such as the memory accessible to the computer processor, with each of the OPCODE field 102, SOURCE field 104, and TARGET field 106 being assigned particular values. The computer processor may then fetch the instruction 100 from the computer-readable medium and execute the instruction 100. When the computer processor executes the instruction 100, the computer processor recognizes that the value of the OPCODE field 102 indicates that the instruction 100 is an instruction to load two consecutive registers from a pair of memory locations. As a result, the computer processor fetches the value stored in the first memory location, specified by the value stored in the SOURCE field 104, and load the fetched value into the first target register specified by the value stored in the TARGET field 106. The computer processor then fetches the value stored in the next consecutive memory location after the first memory location and load the fetched value into a second target register having a predetermined relationship with the first target register. Typically, the second target register is the next consecutive register after the first target register. For example, if the first target register (specified by the TARGET field 106), is register number five (typically denoted R5), the second target register will be register number six (typically denoted R6). The predetermined relationship between the first target register and the second target register is determined by the computer processor and cannot be modified by altering the contents of the instruction 100. As a result, the instruction 100 can only be used to load pairs of memory locations into registers having a predetermined relationship with each other, such as consecutive registers.

Figure 2:
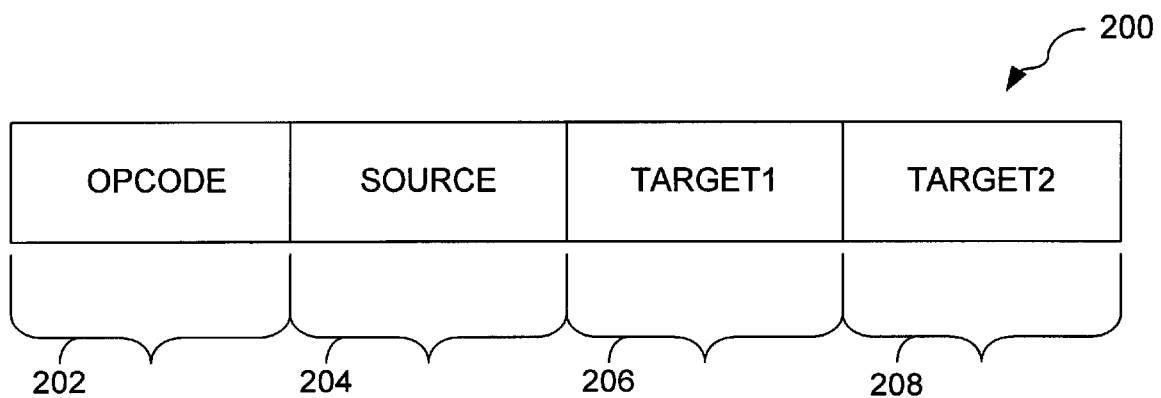
FIGS. 2–3 are block diagrams of instructions for loading a pair of independent registers from a pair of memory locations according to particular embodiments of the present invention.

Referring to FIG. 2, an example of an instruction 200, executable by a computer processor, according to one embodiment of the present invention for loading a pair of independent registers from a pair of memory locations is shown. The instruction 200 includes an OPCODE field 202 specifying that the instruction 200 is an instruction to load two independent registers from a pair of memory locations. The instruction 200 also includes a SOURCE field 204 specifying a first value and a second value. The SOURCE field 204 may specify the first and second values in any of a number of ways. For example, in the embodiment described below, the SOURCE field 204 specifies an address of a first location in a memory accessible to a computer processor, where the first location contains the first value. The computer processor that executes the instruction 200 obtains the second value by reading the second value from a second location whose address has a predetermined relationship with the address of the first location. The SOURCE field 204 may, however, specify the first and second values in any of a number of ways, such as by specifying registers containing the first and/or second values or by directly specifying the first and/or second values. The present invention is therefore not limited to loading independent registers with values obtained from any particular source or values generated in any particular manner.

The instruction 200 includes a TARGET1 field 206 specifying a first target register to load with the first value (e.g., the first value contained in the first memory location specified by the SOURCE field 204), and a TARGET2 field 208 specifying a second target register to load with a second value. The second value (i.e., the value that is loaded into the second target register) may have a predetermined relationship with the first value (i.e., the value that is loaded into the first target register). For example, if the SOURCE field 204 species a first memory location containing the first value, the second value may be the value stored in a second memory location having a predetermined relationship with the first memory location. For example, the first memory location and the second memory location may have consecutive addresses in the memory accessible to the computer processor.

The first and second values may each be any kind of value. For example, the first and second values may each be a word having a size (e.g., 32 or 64 bits) that is native to the computer processor executing the instruction 200. The first and second values may, for example, be single- or double-precision floating point values or integer values. The first and second values may be the same kind of values or different kinds of values.

As with the prior art instruction 100 (FIG. 1), the instruction 200 is shown in block diagram form for ease of illustration. The particular format of the instruction 200 may be specified in any manner by the associated computer processor. For example, each of the OPCODE field 202, SOURCE field 204, TARGET1 field 206, and TARGET2 field 208 and TARGET field 206 may include a predetermined number of bits and be interpreted by the computer processor in a predetermined manner. For example, the computer processor may recognize a predetermined value stored in the OPCODE field 202 as the opcode corresponding to an instruction for loading two independent registers from a pair of memory locations. The SOURCE field 204 may specify the address of the first memory location in a format that may be used to address the memory accessible to the computer processor. An example embodiment of the instruction 200 is described in more detail below with reference to FIG. 3.

The TARGET1 field 206 may specify a numerical identifier that uniquely identifies the first target register to load from the first memory location, and the TARGET2 field 208 may specify a numerical identifier that uniquely identifies the second target register to load from the second memory location. Inclusion of both the TARGET1 field 206 and the TARGET2 field 208 in the instruction 200 makes it possible to specify two independent target registers in the instruction 200. In other words, the two target registers that are loaded by the instruction 200 need not have any predetermined relationship to each other. Rather, any target register may be specified by each of the TARGET1 field 206 and TARGET2 field 208. As a result, the TARGET1 field 206 and TARGET2 field 208 may specify any combination of target registers to be loaded. In contrast, as described above, the prior art instruction 100 (FIG. 1) can only specify two target registers having a predetermined relationship to each other, such as consecutive registers. Although the values of the TARGET1 field 206 and TARGET2 field 208 of the instruction 200 may, for example, specify consecutive target registers, the instruction 200 is not limited to specifying such registers or to specifying target registers having any predetermined relationship to each other.

The instruction 200 may, for example, be a single word (such as a 32-bit or 64-bit word) in which each of the OPCODE field 202, SOURCE field 204, TARGET1 field 206, and TARGET2 field 208 may, for example, be a bit field including a predetermined number of bits. Alternatively, each of the fields 202–208 may be a separate word. It should be appreciated that the fields 202–208 may each be of any length and be combined or separated into a fewer or greater number of words to suit the needs of particular computer processors.

The instruction 200 shown in FIG. 2 may be tangibly embodied in a computer-readable medium, such as the memory accessible to the computer processor, with each of the OPCODE field 202, SOURCE field 204, TARGET1 field 206, and TARGET2 field 208 being assigned particular values. The computer processor may fetch the instruction 200 from the computer-readable medium and execute the instruction 200. When the computer processor executes the instruction 200, the computer processor recognizes that the value of the OPCODE field 202 indicates that the instruction 200 is an instruction to load two independent registers from a pair of memory locations. As a result, the computer processor fetches the first value stored in the first memory location (specified by the value stored in the SOURCE field 204) and load the first value into the first target register (specified by the value stored in the TARGET1 field 206).

The computer processor then fetches the second value stored in the next consecutive memory location after the first memory location and load the second value into the second target register (specified by the value stored in the TARGET2 field 208).

Although the instruction 200 is described above as an instruction to load two consecutive memory locations into a pair of independent target registers, the two memory locations addressed by the instruction 200 need not be consecutive. Rather, the two memory locations may be any two locations having a predetermined relationship to each other as determined by the computer processor. For example, the computer processor may interpret the instruction 200 as an instruction to load two independent registers from a pair of memory locations whose addresses differ by a predetermined amount, such as by two words.

The ability to load independent registers with a pair of values provides various benefits and advantages. For example, the effective speed of register load instructions may be effectively increased by combining a pair of register load instructions into a single load pair instruction, such as the instruction 200, to load a pair of independent registers. In this way, two register load instructions, which would previously require two processor cycles to execute, may now effectively be executed in a single processor cycle using a single load pair instruction, such as the instruction 200. As a result, the ability to load independent registers from a pair of memory locations represents an increase in efficiency over conventional register load instructions that load only a single register.

Furthermore, the ability to load independent registers with a pair of values may result in increased speed compared to conventional load pair instructions, which are limited to loading pairs of consecutive registers. Providing the ability to load any two registers with a pair of values increases the range of situations in which a load pair instruction may be used, thereby increasing the range of situations in which the increased speed provided by the load pair instruction can be realized. For example, the ability to load independent registers with a pair of values may be advantageously used to improve efficiencies obtained by compiler optimizations such as software pipelining.

Figure 3:

Referring to FIG. 3, an example of an instruction 300 according to one embodiment of the present invention is shown. The instruction 300 includes a total of forty-one bits for specifying various parameters of the instruction 300, such as the operation defined by the instruction and the operands of the instruction. As shown in FIG. 3, bits 40–27 and 5–0 of the instruction 300 correspond to the OPCODE field 202 of the instruction 200 shown in FIG. 2, bits 26–20 of the instruction 300 correspond to the SOURCE field 204 of the instruction 200, bits 19–13 of the instruction 300 correspond to the TARGET1 field 206 of the instruction 200, and bits 12–6 correspond to the TARGET2 field 208 of the instruction 200. The instruction 300 is merely one example of a way in which the instruction 200 may be implemented, and the particular features of the instruction 300 do not constitute limitations of the present invention.

Referring again to FIG. 3, the instruction 300 includes four bits (numbered 40–37) that specify the major category into which the instruction 300 falls. For example, the value "6" shown in bits 40–37 indicate that the instruction 300 falls in the category of load and store instructions. Bit 36 specifies a memory reference post-modify opcode extension, which indicates that the SOURCE field 204 is to be modified and re-stored in the instruction 200 as part of executing the instruction 200. Bits 35–30 specify the particular variety of load operation performed by the instruction 300. For example, the field $x_6$ may be used to specify whether the registers to load are double precision registers, single precision registers, or 64-bit integer registers. The instruction 300 includes two bits (numbered 29–28) labeled hint that specify a memory reference hint opcode extension, which may be used to change where in the cache hierarchy the loaded value is to be stored. For example, the hint field may be used to specify that the loaded value is to be stored in level 2 of the processor cache. The instruction 300 includes a single bit (numbered 27) labeled x that specifies an opcode extension. This field may be used, for example, to distinguish between load operations (operations that load a single memory location into a single register) and load pair operations (operations that load a pair of values into a pair of registers). The value of the x field may have other meanings for instructions other than load instructions.

Bit positions 26–20, labeled $r_3$, specify a source register that stores a value indicating the address of a first memory location from which to load a first value. The instruction 300 includes a field $f_2$, corresponding to bit positions 19–13, that specifies a second target register to load with a second value. Bit positions 12–6, labeled $f_1$, specify a first target register to load with the first value. Bit positions 5–0, labeled $q_p$, indicates a qualifying predicate that indicates whether the instruction should be executed.

Figure 4:
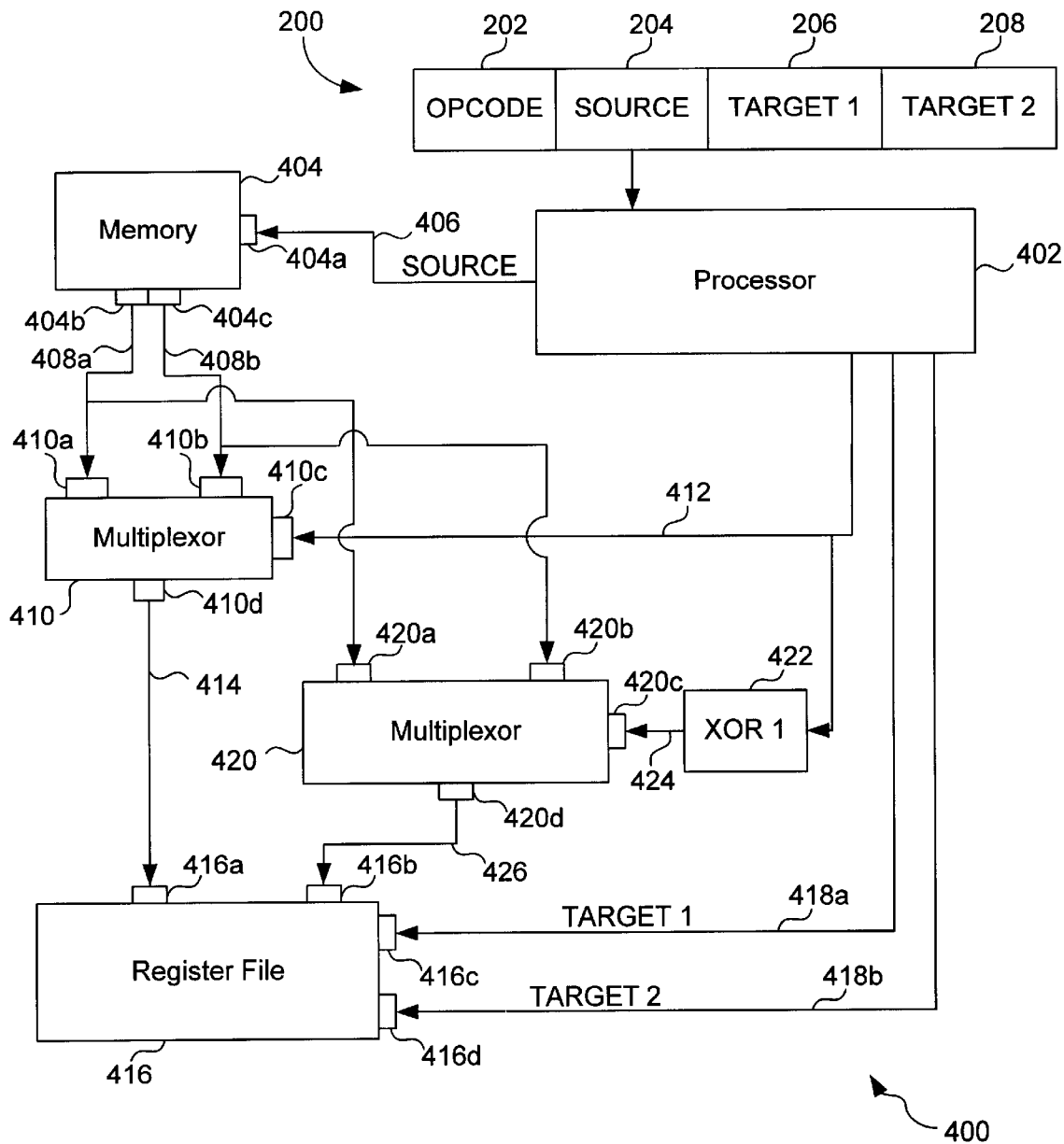
FIG. 4. is a block diagram of a computer system for executing an instruction to load a pair of independent registers from a pair of memory locations according to one embodiment of the present invention.

Referring to FIG. 4, an example of a system 400 for executing the instruction 200 (FIG. 2) to load a pair of independent registers from a pair of memory locations according to one embodiment of the present invention is shown. It should be appreciated that the system 400 shown in FIG. 4 is merely one example of a system for executing the instruction 200, and that any of a variety of other systems may be used to execute the instruction 200. The system 400 includes a computer processor 402 for executing the instruction 200. The instruction 200 may be stored in any computer-readable medium, such as a memory 404. The memory 404 may be any kind of memory, such as a Random Access Memory (RAM), Read-Only Memory (ROM), or a cache memory. The processor 402 receives the instruction 200 as an input. The processor 402 reads the instruction 200 and determines, based on the contents of the OPCODE field 202, that the instruction 200 is an instruction to load a pair of independent registers from a pair of memory locations. The processor 402 provides an address signal 406, representing the address of the first memory location specified by the SOURCE field 204 of the instruction 200, on an address input 404a of the memory 404. In response, the memory 404 provides memory data signals 408a and 408b on data outputs 404b and 404c, respectively. The memory data signals 408a and 408b may, for example, represent data read from the memory location specified by the contents of the SOURCE field 204 and the next consecutive memory location, respectively. The memory data signals 408a and 408b may, however, represent data read from any two memory locations in the memory 404 whose addresses can be derived by the memory 404 from the address signal 406 provided at input 404a. The memory data signals 408a and 408b provided by the memory 404 on outputs 404b and 404c, respectively, therefore represent data read from memory locations having a predetermined relationship to each other.

The memory data signals 408a and 408b are respectively provided to a first data input 410a and a second data input 410b of a first multiplexor 410. The processor 402 provides a first selection signal 412 to a selection input 410c of the first multiplexor 410. The first selection signal 412 selects one of the memory data signals 408a–b to be delivered as a first register data signal 414 on a data output 410d of the first multiplexor 410. In one embodiment, for example, the selection signal 412 corresponds to the low-order bit of the contents of the SOURCE field 204 of the instruction 200.

The first register data signal 414 is delivered to a first register port 416a of a register file 416. The register file 416 may be any kind of register file, and the register file 416 may also be one or more individual registers accessible to the processor 402. The processor 402 delivers a first target register signal 418a to a first register port address input 416c of the register file 416. The first register target signal 418a specifies a register in the register file 416 in which to store the first register data signal 414. The processor 402 may, for example, deliver the contents of the TARGET1 field 406 of the instruction 200 as the first target register signal 418a. The register file 416 stores the first register data signal 414 in the register specified by the first target register signal 418a. As a result, the value stored in the first memory location specified by the SOURCE field 204 of the instruction 200 is stored in the first target register specified by the contents of the TARGET1 field 206 of the instruction 200.

The memory data signals 408a–b are also respectively provided to a first data input 420a and a second data input 420b of a second multiplexor 420. The processor 402 provides the first selection signal 412 to an XOR gate 422, which performs a logical exclusive OR (XOR) operation using 1 (one) as the first operand and the first selection signal 412 as the second operand, to produce a second selection signal 424. As described above, the first selection signal 412 is used to select one of the memory data signals 408a–b for output to the first register port 416a of the register file 416. As described below, the second selection signal 424 is used to select the other one of the memory data signals 408a–b for output to a second register port 416b of the register file 416. Although, in the embodiment described above, the XOR gate 422 is used to generate the second selection signal 424, any appropriate means may be used to derive the second selection signal 424 from the first selection signal 412. Furthermore, as described above, the memory data signals 408a–b may be derived from two memory locations having any predetermined relationship with each other.

The second multiplexor 420 receives the second selection signal 424 at a selection input 420c. The second selection signal 424 selects one of the memory data signals 408a–408b to be delivered as a second register data signal 426 on a data output 420d.

The second register data signal 426 is delivered to a second register port 416b of the register file 416. The processor 402 delivers a second target register signal 418b to a second register port address input 416d of the register file 416. The processor 402 may, for example, deliver the contents of the TARGET2 field 208 of the instruction 200 as the second target register signal 418b. The register file 416 stores the second register data signal 426 in the register specified by the second target register signal 418b. As a result, the value stored in the second memory location (i.e., the memory location having a predetermined relationship to the memory location specified by the SOURCE field 204 of the instruction 200) is loaded into the second target register specified by the contents of the TARGET2 field 208 of the instruction 200.

Figure 5:
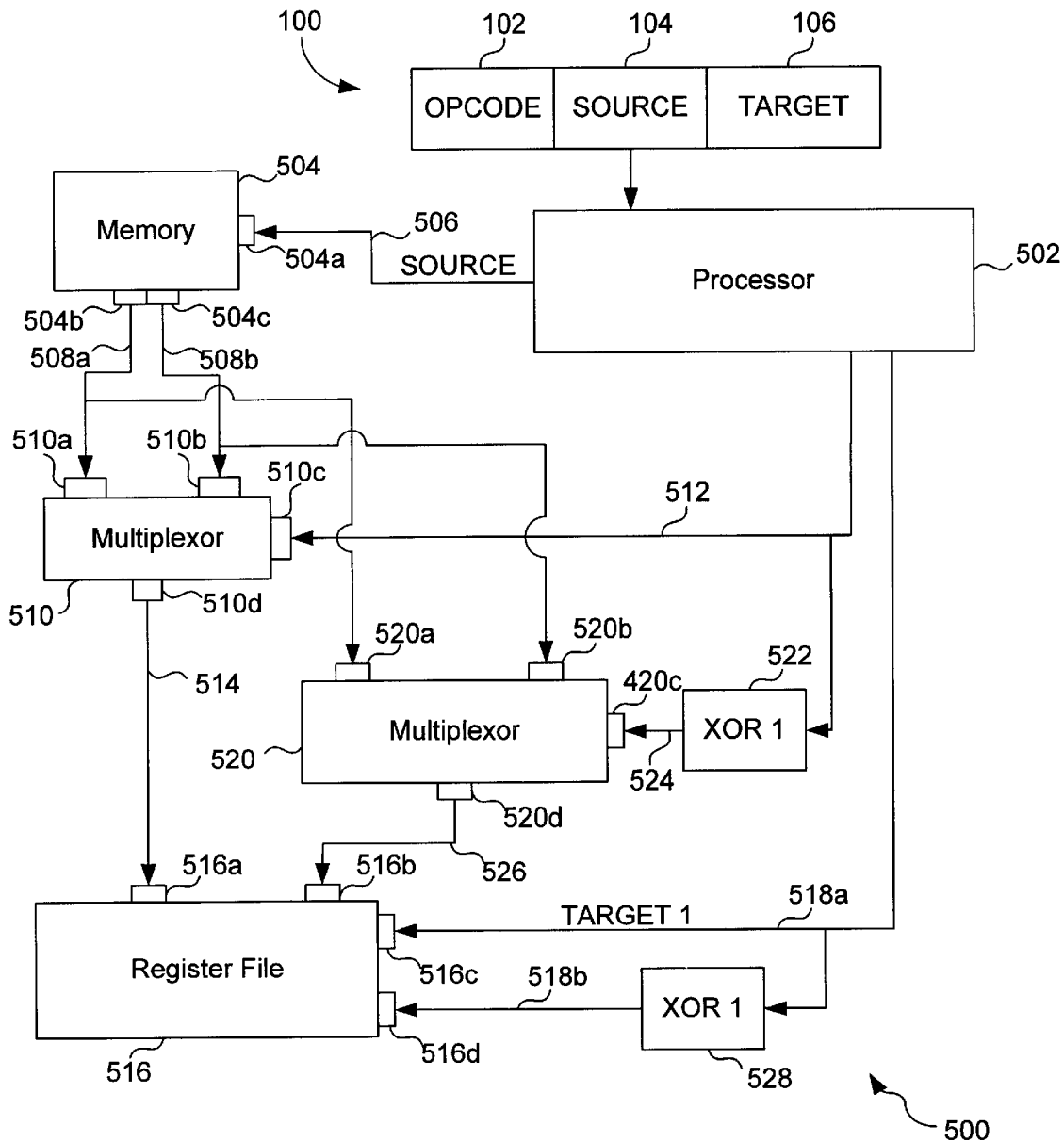
FIG. 5 is a block diagram of a portion of a prior art computer system for executing an instruction to load a pair of consecutive registers from a pair of consecutive memory locations.

Referring to FIG. 5, a portion of a prior art system 500 for executing a conventional load pair instruction (e.g., the instruction 100 shown in FIG. 1) to load a pair of consecutive registers from a pair of consecutive memory locations is shown. The system 500 includes a computer processor 502 for executing the instruction 100. The system 500 also includes a memory 504, a first multiplexor 510, a second multiplexor 520, and an XOR gate 522 that perform the same functions as the memory 404, the first multiplexor 410, the second multiplexor 420, and the XOR gate 422, respectively, shown in FIG. 4. The processor 502 receives the instruction 100 as an input. The processor 502 reads the instruction 100 and determines, based on the contents of the OPCODE field 102, that the instruction 100 is an instruction to load a pair of consecutive registers from a pair of consecutive memory locations. The processor 502, delivers a first target register signal 518a to a first register port address input 516a of a register file 516. The processor 502 may, for example, deliver the contents of the TARGET field 106 as the first target register signal 518a. The first target register signal 518a is also delivered to an input of an XOR gate 528, which performs a logical exclusive OR (XOR) operation using 1 (one) as the first operand and the first target register signal 518a as the second operand, to produce a second target register signal 518b. The second target register signal 518b is delivered to a second register port address input 516d of the register file 516. As a result of developing the second target register signal 518b by processing the first target register signal 518a using the XOR gate 528, the second target register signal 518b has a predetermined relationship to the first target register signal 518a. It should be appreciated that the system 500 shown in FIG. 5 is limited to loading pairs of values to a pair of registers having a predetermined relationship. In contrast, the system 400 (FIG. 4), as described above, may be used to load pairs of values to any two registers.

Having now described a few embodiments, it should be apparent to those skilled in the art that the foregoing is merely illustrative and not limiting, having been presented by way of example only. Numerous modifications and other embodiments are within the skill of one of ordinary skill in the art and are contemplated as falling within the scope of the invention.

What is claimed is:

1. A computer-readable medium encoded with an instruction for execution by a processor, the instruction comprising:
    an opcode field specifying an instruction to load, in a single processor cycle, two independently selected registers with a first value and a second value from a memory or from the instruction;
    a source field specifying the first value and the second value;
    a first target register field specifying a first target register to load with the first value; and
    a second target register field specifying a second target register to load with the second value.

2. The computer-readable medium of claim 1, in conjunction with the processor.

3. The computer-readable medium of claim 1, wherein the computer-readable medium comprises the memory accessible to the processor.

4. The computer-readable medium of claim 3, wherein the source field specifies an address of a first location in the memory, the first location containing the first value.

5. The computer-readable medium of claim 4, wherein the address of the first location has a predetermined relationship with an address of a second location in the memory, and wherein the processor is configured to derive the address of the second location from the address of the first location based on the predetermined relationship.

6. The computer-readable medium of claim 5, wherein the address of the first location and the address of the second location differ by one word.

7. The computer-readable medium of claim 1, wherein the opcode field, the source field, the first target register field, and the second target register field comprise bit fields of a single word accessible to the processor.

8. The computer-readable medium of claim 1, wherein the opcode field, the source field, the first target register field, and the second target register field each comprises a word accessible to the processor.

9. A method for executing an instruction, the method comprising steps of:
    (A) receiving an instruction including an opcode field specifying that the instruction is an instruction to load, in a single processor cycle, two independently selected registers with a first value and a second value from a memory or from the instruction, a source field specifying the first value and the second value, a first target register field specifying a first target register to load with the first value, and a second target register field specifying a second target register to load with the second value;
    (B) providing a first target register signal, specifying the first target register, to a first register port address input of a register file; and
    (C) providing a second target register signal, specifying the second target register, to a second register port address input of the register file.

10. The method of claim 9, further comprising steps of:
    (D) providing the first value to a first register port of the register file; and
    (E) providing the second value to a second register port of the register file.

11. The method of claim 10, further comprising steps of:
    (F) storing the first value in the first target register; and
    (G) storing the second value in the second target register.

12. The method of claim 9, wherein the source field specifies an address of a first location in a memory accessible to a processor, the first location containing the first value.

13. The method of claim 12, wherein the address of the first location has a predetermined relationship with an address of a second location in the memory, and wherein the method further comprises a step of:
    (D) deriving the address of the second location from the address of the first location based on the predetermined relationship.

14. The method of claim 13, wherein the step (D) comprises a step of adding one word to the address of the first location to derive the address of the second location.

15. The method of claim 9, wherein the opcode field, the source field, the first target register field, and the second target register field comprise bit fields of a single word accessible to a processor.

16. The method of claim 9, wherein the opcode field, the source field, the first target register field, and the second target register field each comprises a word accessible to the processor.

17. Apparatus for executing an instruction, the apparatus comprising:
    means for receiving an instruction including an opcode field specifying that the instruction is an instruction to load, in a single processor cycle, two independently selected registers with a first value and a second value from a memory or from the instruction, a source field specifying the first value and the second value, a first target register field specifying a first target register to load with the first value, and a second target register field specifying a second target register to load with the second value;

means for providing a first target register signal, specifying the first target register, to a first register port address input of a register file; and means for providing a second target register signal, specifying the second target register, to a second register port address input of the register file.

18. The apparatus of claim 17, further comprising:

means for providing the first value to a first register port of the register file; and means for providing the second value to a second register port of the register file.

19. The apparatus of claim 17, further comprising:

means for storing the first value in the first target register; and means for storing the second value in the second target register.

20. The apparatus of claim 17, wherein the source field specifies an address of a first location in a memory accessible to a processor, the first location containing the first value.

21. The apparatus of claim 20, wherein the address of the first location has a predetermined relationship with an address of a second location in the memory, and wherein the apparatus further comprises:

means for deriving the address of the second location from the address of the first location based on the predetermined relationship.

22. The apparatus of claim 21, wherein the means for deriving comprises means for adding one word to the address of the first location to derive the address of the second location.

23. The apparatus of claim 17, wherein the opcode field, the source field, the first target register field, and the second target register field comprise bit fields of a single word accessible to a processor.

24. The apparatus of claim 17, wherein the opcode field, the source field, the first target register field, and the second target register field each comprises a word accessible to the processor.

25. A system for executing an instruction, the system comprising:

a processor comprising:

an input to receive an instruction including an opcode field specifying that the instruction is an instruction to load, in a single processor cycle, two independently selected registers with a first value and a second value from a memory or from the instruction, a source field specifying the first value and the second value, a first target register field specifying a first target register to load with the first value, and a second target register field specifying a second target register to load with the second value;

a first output to provide a first target register signal specifying the first target register; and a second output to provide a second target register signal specifying the second target register;

a memory comprising a first output to provide a first memory data signal representing the first value and having a second output to provide a second memory data signal representing the second value; and a register file comprising a first register port to receive the first memory data signal, a second register port to receive the second memory data signal, a first register port address input to receive the first target register signal, and a second register port address input to receive the second target register signal, the register file being configured to store the first value in the first target register and to store the second value in the second target register.

26. The system of claim 25, wherein the source field specifies an address of a first location in the memory, the first location containing the first value.

27. The system of claim 26, wherein the address of the first location has a predetermined relationship with an address of a second location in the memory, and wherein the processor is configured to derive the address of the second location from the address of the first location based on the predetermined relationship.

28. The system of claim 27, wherein the address of the first location and the address of the second location differ by one word.

29. The system of claim 25, wherein the opcode field, the source field, the first target register field, and the second target register field comprise bit fields of a single word accessible to the processor.

30. The system of claim 25, wherein the opcode field, the source field, the first target register field, and the second target register field each comprises a word accessible to the processor.

* * * * *